US012565441B2

(12) United States Patent 
Honda

(10) Patent No.: US 12,565,441 B2 
(45) Date of Patent: Mar. 3, 2026

(54) OPTICAL FIBER MANUFACTURING METHOD AND OPTICAL FIBER MANUFACTURING APPARATUS

(71) Applicant: Fujikura Ltd., Tokyo (JP)

(72) Inventor: Tomoyasu Honda, Suzuka (JP)

(73) Assignee: Fujikura Ltd., Tokyo (JP)

( * ) Notice: Subject to any disclaimer, the term of this patent is extended or adjusted under 35 U.S.C. 154(b) by 155 days.

(21) Appl. No.: 18/561,500

(22) PCT Filed: Mar. 31, 2022

(86) PCT No.: PCT/JP2022/016599

§ 371 (c)(1), 
(2) Date: Nov. 16, 2023

(87) PCT Pub. No.: WO2022/244529

PCT Pub. Date: Nov. 24, 2022

(65) Prior Publication Data

US 2024/0228359 A1 Jul. 11, 2024

(30) Foreign Application Priority Data

May 18, 2021 (JP) ................................. 2021-083927

(51) Int. Cl. 
C03B 37/012 (2006.01)

(52) U.S. Cl. 
CPC .. C03B 37/01242 (2013.01); C03B 37/01257 (2013.01); *C03B 2205/45* (2013.01)

(58) Field of Classification Search 
None 
See application file for complete search history.

(56) References Cited

U.S. PATENT DOCUMENTS

2001/0047667 A1* 12/2001 Desalle ............... C03B 37/0253 
65/382 
2003/0164007 A1 9/2003 Simons et al.

FOREIGN PATENT DOCUMENTS

| | | |
|---|---|---|
| CN | 206188658 U | 5/2017 |
| JP | S53043540 A | 4/1978 |
| JP | S63190738 A * | 8/1988 |

(Continued)

OTHER PUBLICATIONS

International Search Report issued in corresponding International Application No. PCT/JP2022/016599 mailed May 31, 2022 (5 pages).

*Primary Examiner* — Erin Snelting 
(74) *Attorney, Agent, or Firm* — Osha Bergman Watanabe & Burton LLP

(57) ABSTRACT

An optical fiber manufacturing method includes supplying power to a drawing furnace to cause T/V to decrease to $T_{target}/V_{target}$ along a quadratic function having a value of the $T_{target}/V_{target}$ at an apex with lapse of time, where T is a tension applied to an optical fiber when an optical fiber preform is heated by the drawing furnace and the optical fiber is drawn, V is speed of withdrawing the optical fiber when the optical fiber is heated by the drawing furnace and the optical fiber is drawn, $T_{target}$ is a target value of the tension, and $V_{target}$ is a target value of the speed.

7 Claims, 4 Drawing Sheets

(56)     References Cited

FOREIGN PATENT DOCUMENTS

| JP | H05-139771  A | 6/1993 |
| JP | H08188438  A | 7/1996 |
| JP | H11-255534  A | 9/1999 |
| JP | 2009-126755  A | 6/2009 |
| JP | 2010-269971  A | 12/2010 |
| JP | 2017-43528  A | 3/2017 |
| JP | 2019077598  A | 5/2019 |
| WO | 2008/062465  A2 | 5/2008 |

* cited by examiner

FIG. 6

OPTICAL FIBER MANUFACTURING METHOD AND OPTICAL FIBER MANUFACTURING APPARATUS

BACKGROUND

Technical Field

The present invention relates to an optical fiber manufacturing method and an optical fiber manufacturing apparatus.

Description of the Related Art

An optical fiber is manufactured by heating an optical fiber preform by using a drawing furnace, and drawing the optical fiber preform as the optical fiber. It is known that in manufacturing the optical fiber, power to be supplied to the drawing furnace is adjusted according to the speed of withdrawing the optical fiber, tension applied to the optical fiber, or the like.

Patent Literature 1 described below describes that, in order to avoid unnecessarily adjusting power to be supplied to a drawing furnace according to a temporary variation in tension applied to an optical fiber due to a temporary variation in the speed of withdrawing the optical fiber, the power to be supplied to the drawing furnace is adjusted in such a way that a ratio obtained by dividing the tension applied to the optical fiber by the speed of withdrawing the optical fiber is maintained to a target value.

Patent Literature 1: JP H05-139771 A

However, Patent Literature 1 described above does not consider a preprocessing process after the optical fiber preform starts to be heated by using the drawing furnace and before the ratio described above reaches the target value. For example, even if power to be supplied to the drawing furnace is adjusted to make the ratio have the target value, the ratio deviates from the target value, and the power is adjusted again in some cases. Therefore, it is requested that the time required for the preprocessing process be reduced to improve productivity.

SUMMARY

One or more embodiments provide an optical fiber manufacturing method and an optical fiber manufacturing apparatus that are capable of improving productivity of an optical fiber.

An optical fiber manufacturing method according to one or more embodiments includes a preprocessing process for supplying power to a drawing furnace to cause T/V to decrease to $T_{target}/V_{target}$ along a quadratic function having a value of the $T_{target}/V_{target}$ at an apex with the lapse of time, in a case where tension applied to an optical fiber and speed of withdrawing the optical fiber in heating an optical fiber preform by using the drawing furnace and drawing the optical fiber are respectively T and V, a target value of the tension is $T_{target}$, and a target value of the speed is $V_{target}$.

An optical fiber manufacturing apparatus according to one or more embodiments includes: a drawing furnace that heats an optical fiber preform, and draws an optical fiber; a power supply unit (example of a power supplier) that supplies power to the drawing furnace; and a control unit (example of a controller), and the control unit controls the power supply unit to cause T/V to decrease to $T_{target}/V_{target}$ along a quadratic function having a value of the $T_{target}/V_{target}$ at an apex with the lapse of time, in a case where tension applied to the optical fiber and speed of withdrawing the optical fiber in drawing the optical fiber are respectively T and V, a target value of the tension is $T_{target}$, and a target value of the speed is $V_{target}$.

The tension described above may be tension applied to a bare optical fiber that is not coated with a coating layer. Furthermore, T/V described above corresponds to a diameter of the drawn optical fiber. Therefore, $T_{target}/V_{target}$ is a value that corresponds to a target diameter of the optical fiber, and this $T_{target}/V_{target}$ is specified according to, for example, a material of the optical fiber preform, the drawing furnace, or the like.

As a result of intensive studies, the present inventor has discovered that by causing T/V to decrease to $T_{target}/V_{target}$ along the quadratic function described above, T/V is not likely to deviate from $T_{target}/V_{target}$ after T/V has become $T_{target}/V_{target}$ in comparison with a case where T/V linearly decreases, that is, a case where a rate of decrease in T/V is roughly constant. Therefore, power to be supplied to the drawing furnace is prevented from being adjusted after T/V has become $T_{target}/V_{target}$. Accordingly, by employing the optical fiber manufacturing method and the optical fiber manufacturing apparatus that have been described above, the time required for T/V to stabilize at a target value, that is, the time required for tension T and speed V to stabilize at a target value, can be reduced, and the productivity of the optical fiber can be improved.

Furthermore, in a case where the time required for T/V described above to change to $T_{target}/V_{target}$ described above is $t_0$, and a constant specified in advance according to the optical fiber preform is $a_0$, the quadratic function indicating a change over time T(t)/V(t) of T/V described above may be expressed by the formula described below $$T(t)/V(t) = a_0(t - t_0)^2 + \left(T_{target}/V_{target}\right).$$

The present inventor has intensively studied a change over time in T/V during a period after the optical fiber preform starts to be heated and before T/V described above becomes roughly constant. As a result, the present inventor has discovered that in a case where constant power is supplied to the drawing furnace, T/V decreases along a quadratic function having a minimum value at an apex with the lapse of time until a certain point in time to reach the apex of this quadratic function, from the certain point in time, T/V becomes roughly constant at a value of this apex, and this roughly constant value of T/V corresponds to a value of the constant power. Therefore, for example, the constant $a_0$ and the time to that have been described above can be obtained in advance for a predetermined optical fiber preform in an experiment, and constant power that causes T/V to decrease according to the formula described above can also be grasped in advance. Thus, by supplying this constant power to the drawing furnace, T/V can be caused to decrease roughly along a quadratic function having a value of $T_{target}/V_{target}$ at an apex with the lapse of time, and a control load can be reduced.

Alternatively, in the optical fiber manufacturing method described above, in the preprocessing process, constant power may be supplied to the drawing furnace during a predetermined period to obtain a quadratic function indicating a change over time in T/V described above, and the constant power to be supplied to the drawing furnace may be changed on the basis of a difference between a value of T/V described above at an apex of the quadratic function and $T_{target}/V_{target}$ described above.

The present inventor has discovered that in a case where power is made constant, as described above, T/V decreases along a quadratic function having a minimum value at an apex with the lapse of time until a certain point in time. Therefore, the above enables T/V to decrease to $T_{target}/V_{target}$ along a quadratic function having a value of $T_{target}/V_{target}$ at an apex with the lapse of time, without specifying in advance the quadratic function having a value of $T_{target}/V_{target}$ at the apex in an experiment or the like.

Furthermore, in the optical fiber manufacturing method described above, the preprocessing process may be performed after a positioning process for inserting a neck-down portion of the optical fiber preform into a position of a heater in the drawing furnace.

A change over time in T/V before the neck-down portion of the optical fiber preform reaches the position of the heater in the drawing furnace has a tendency of deviating from the quadratic function. Therefore, before the neck-down portion of the optical fiber preform has reached the position of the heater, it is difficult to cause T/V to decrease along the quadratic function, and a control load can be imposed. In view of this, the preprocessing process is performed after the positioning process, and this enables a reduction in such a control load.

Furthermore, the tension may be tension applied to the bare optical fiber.

In this case, a value of the tension T does not include a component of tension caused by the coating layer. Therefore, T/V can be more accurately calculated than a case where the value of the tension T includes the component of the tension caused by the coating layer.

In this case, in a case where the tension applied to the bare optical fiber is Tg, a cross-sectional area of the bare optical fiber is Sg, and a target value of the cross-sectional area of the bare optical fiber is $S_{target}$, the tension may be a value calculated according to the formula described below $$T = Tg \times (S_{target}/Sg).$$

In practice, the tension Tg applied to the bare optical fiber receives an influence of a variation in the cross-sectional area Sg of the bare optical fiber. Accordingly, as described as the formula described above, a ratio of a measured value of the cross-sectional area of the bare optical fiber and a target value of the cross-sectional area of the bare optical fiber is taken into consideration in the tension Tg, and this enables a value of T/V to be more accurately calculated.

As described above, according to one or more embodiments, an optical fiber manufacturing method and an optical fiber manufacturing apparatus that are capable of improving productivity of an optical fiber can be provided.

BRIEF DESCRIPTION OF THE DRAWINGS

FIG. 6 is a graph schematically illustrating a change over time in T/V according to a variation of the embodiments.

DESCRIPTION OF THE EMBODIMENTS

An optical fiber manufacturing method and an optical fiber manufacturing apparatus according to one or more embodiments is described below as an example with reference to the attached drawings. The embodiments described below as an example is provided in order to make the present invention easily understandable, and is not to be construed as limitations of the present invention. Variations or modifications can be made to the embodiments described below without departing from the spirit of the present invention. Furthermore, herein, in some cases, the dimensions of each member are exaggeratedly described in order to facilitate understanding.

Figure 1:
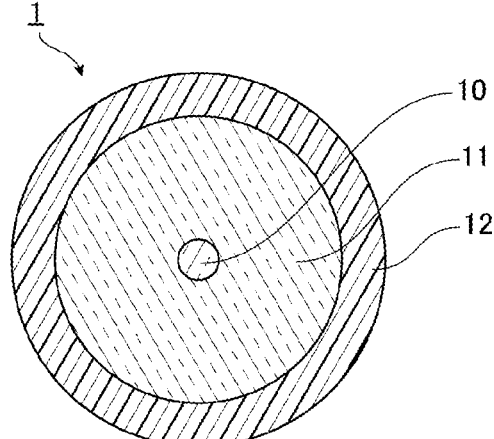
FIG. 1 is a diagram schematically illustrating a state of a cross-section that is perpendicular to a longitudinal direction of an optical fiber according to one or more embodiments.

FIG. 1 is a diagram schematically illustrating a state of a cross-section that is perpendicular to a longitudinal direction of an optical fiber according to one or more embodiments. As illustrated in FIG. 1, an optical fiber 1 according to one or more embodiments includes, as a principal configuration, a core 10, a clad 11 that surrounds an outer peripheral surface of the core 10, and a coating layer 12 that coats an outer peripheral surface of the clad 11. An outer shape of the core 10 in this cross-section is a circle, and the core 10 is disposed in a center of the clad 11. Note that an outer shape of the clad 11 in the cross-section may be a non-circle such as an ellipse or a polygon. FIG. 1 illustrates the optical fiber 1 in which the outer shape of the clad 11 is a circle.

A refractive index of the core 10 is higher than a refractive index of the clad 11. In one or more embodiments, the core 10 is made of silica glass without any additives, and the clad 11 is made of silica glass added with a dopant that makes the refractive index lower, such as fluorine (F). Note that the core 10 may be made of silica glass added with a dopant that makes the refractive index higher, such as germanium (Ge), and the clad 11 may be made of silica glass without any additives. Furthermore, the core 10 may be made of silica glass added with a dopant that makes the refractive index higher, and the clad 11 may be made of silica glass added with a dopant that makes the refractive index lower. Furthermore, the dopant that makes the refractive index higher and the dopant that makes the refractive index lower are not particularly limited.

The coating layer 12 is made of resin. Examples of a resin that constitutes the coating layer 12 include a thermosetting resin and an ultraviolet-curable resin. The coating layer 12 may have a single-layer structure constituted by a single resin layer that surrounds the clad 11, or may be a multilayer structure constituted by a plurality of resin layers.

Figure 2:
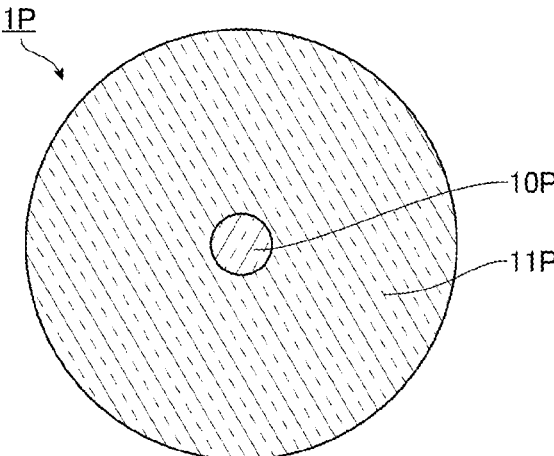
FIG. 2 is a diagram schematically illustrating a state of a cross-section that is perpendicular to a longitudinal direction of an optical fiber preform for manufacturing the optical fiber illustrated in FIG. 1.

FIG. 2 is a diagram schematically illustrating a state of a cross-section that is perpendicular to a longitudinal direction of an optical fiber preform for manufacturing the optical fiber 1 illustrated in FIG. 1. As illustrated in FIG. 2, an optical fiber preform 1P is constituted by a core glass body 10P that will be formed into the core 10 and has a rod shape, and a clad glass body 11P that surrounds an outer peripheral surface of the core glass body 10P and will be formed into the clad 11. In one or more embodiments, an outer shape of the clad glass body 11P in this cross-section is a circle, and the core glass body 10P is disposed in a center of the clad glass body 11P. Furthermore, an outer shape of the core glass body 10P in the cross-section is a circle.

Figure 3:
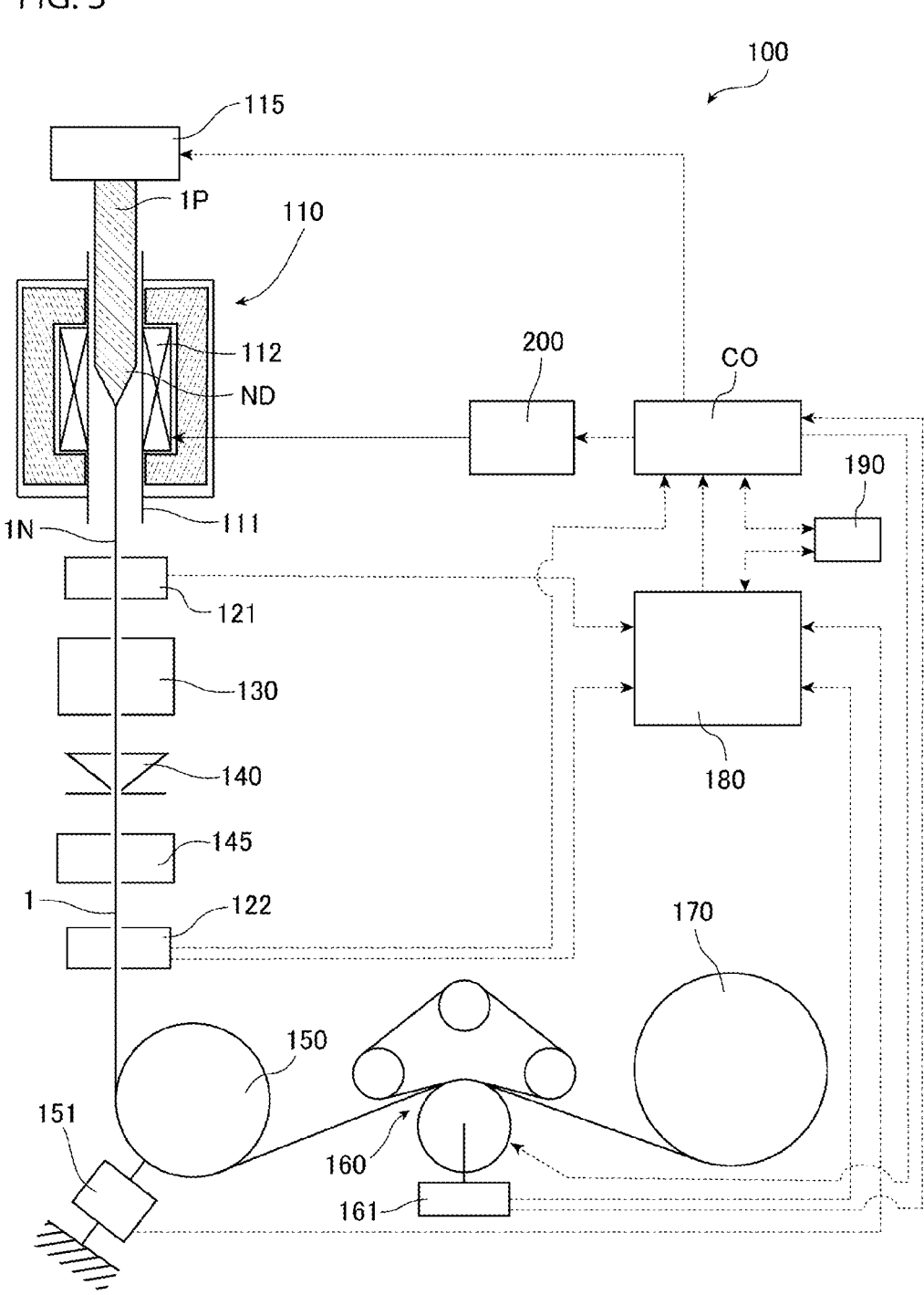
FIG. 3 is a diagram schematically illustrating an optical fiber manufacturing apparatus according to one or more embodiments.

FIG. 3 is a diagram schematically illustrating an optical fiber manufacturing apparatus according to one or more embodiments. As illustrated in FIG. 1, an optical fiber manufacturing apparatus 100 includes, as a principal configuration, a drawing furnace 110, a feeder 115, a first outer diameter measuring unit 121, a cooling device 130, an application unit 140, a curing unit 145, a second outer diameter measuring unit 122, a turn pulley 150, a tension meter 151, a withdrawal device 160, a speedometer 161, a winding device 170, an arithmetic unit 180, a memory 190, a power supply unit 200, and a control unit CO.

The control unit CO is constituted, for example, by an integrated circuit such as a microcontroller, an integrated circuit (IC), a large-scale integrated circuit (LSI), or an application specific integrated circuit (ASIC), or a numerical control (NC) device. Furthermore, in a case where the NC device is used as the control unit CO, a machine learning device may be used, or the machine learning device may be omitted. As described below, some configurations of the optical fiber manufacturing apparatus 100 are controlled by the control unit co.

The drawing furnace 110 includes a core tube 111, and a heater 112 that is disposed to surround the core tube 111 in such a way that the core tube 111 can be heated. The heater 112 generates heat according to power supplied from the power supply unit 200. The power supply unit 200 adjusts power to be supplied to the heater 112 in accordance with a control signal from the control unit CO. The feeder 115 is mounted on an upper end portion of the optical fiber preform 1P, and is configured to feed the optical fiber preform 1P to a housing space of the core tube 111 from a lower end side. The feeder 115 adjusts the speed of feeding the optical fiber preform 1P in accordance with a control signal from the control unit CO.

The heat generation of the heater 112 causes the core tube 111 to be heated. The optical fiber preform 1P is inserted into the housing space of the core tube 111 from the lower end side, and therefore a lower end portion of the optical fiber preform 1P is heated. The lower end portion of the optical fiber preform 1P that has been heated by the heater 112 enters into a molten state. As a result, a neck-down portion ND that is tapered downward is formed in the lower end portion of the optical fiber preform 1P, and a glass wire is drawn from the neck-down portion ND. Immediately after this drawn glass wire exits from an opening on a lower side of the core tube 111, the glass wire is solidified, the core glass body 10P is formed into the core 10, the clad glass body 11P is formed into the clad 11, and a bare optical fiber 1N that is constituted by the core 10 and the clad 11 is formed.

The first outer diameter measuring unit 121 is disposed below the drawing furnace 110, measures an outer diameter of the bare optical fiber 1N that has been drawn in the drawing furnace 110, and outputs, to the arithmetic unit 180, a signal indicating a value of the measured diameter of the bare optical fiber 1N. An example of the first outer diameter measuring unit 121 is a configuration in which a light irradiation unit that emits a laser beam, and a light receiver that receives the laser beam emitted from the light irradiation unit are included, and the light irradiation unit and the light receiver are disposed to pinch the bare optical fiber 1N.

The cooling device 130 is disposed below the first outer diameter measuring unit 121, and cools down the bare optical fiber 1N to an appropriate temperature. The application unit 140 is disposed below the cooling device 130, and the curing unit 145 is disposed below the application unit 140. The application unit 140 applies resin in an uncured state, which serves as the coating layer 12, to the bare optical fiber 1N, the curing unit 145 cures this resin, and the coating layer 12 is formed. As a result of this, the bare optical fiber 1N is formed into the optical fiber 1. In a case where the coating layer 12 is constituted by a thermosetting resin, the curing unit 145 is configured to apply heat to the resin. In a case where the coating layer 12 is constituted by an ultraviolet-curable resin, the curing unit 145 is configured to irradiate the resin with ultraviolet rays.

The second outer diameter measuring unit 122 is disposed below the curing unit 145, and measures an outer diameter of the coating layer 12, which is an outer diameter of the optical fiber 1. The second outer diameter measuring unit 122 outputs, to the arithmetic unit 180 and the control unit CO, a signal indicating a value of the measured outer diameter of the optical fiber 1. An example of the second outer diameter measuring unit 122 is a configuration that is similar to the first outer diameter measuring unit 121.

The turn pulley 150 is disposed below the second outer diameter measuring unit 122. A direction of the optical fiber 1 is changed by the turn pulley 150, and the optical fiber 1 is withdrawn according to rotation of the withdrawal device 160. This causes tension to be applied to the optical fiber 1. The withdrawal device 160 adjusts the speed of withdrawing the optical fiber 1 in accordance with a control signal from the control unit CO. The optical fiber 1 is obtained by coating the bare optical fiber 1N with the coating layer 12. Therefore, it can be understood that this speed is also the speed of withdrawing the bare optical fiber 1N. The optical fiber 1 that has passed through the withdrawal device 160 that withdraws the optical fiber 1 is fed to the winding device 170, and is wound by the winding device 170.

The tension meter 151 is provided to the turn pulley 150, measures the tension described above, and outputs, to the arithmetic unit 180, a signal indicating a value of the tension. An example of the tension meter 151 is a configuration using a strain gauge.

The speedometer 161 is provided to the withdrawal device 160, measures the speed of withdrawing the optical fiber 1 on the basis of the number of rotations per unit time of the withdrawal device 160, and outputs, to the arithmetic unit 180 and the control unit CO, a signal indicating a value of the speed. An example of the speedometer 161 is a configuration using a magnetic sensor.

The memory 190 is connected to the arithmetic unit 180 and the control unit CO. The memory 190 stores information, and the stored information can be read from the memory 190. The memory 190 is, for example, a non-transitory recording medium, may be a semiconductor recording medium such as a random access memory (RAM) or a read only memory (ROM), and can include a recording medium of an arbitrary format, such as an optical recording medium or a magnetic recording medium. Note that the "non-transitory" recording medium includes a recording medium from which all pieces of data except for a transitory propagating signal can be read, and a volatile recording medium is not excluded. The memory 190 stores information required for an arithmetic operation performed by the arithmetic unit 180 described later, information required for control performed on each configuration by the control unit CO, or the like.

The arithmetic unit 180 performs various arithmetic operations on the basis of input information. An example of the arithmetic unit 180 is a configuration that is similar to the control unit CO. In one or more embodiments, in a case where a diameter of the bare optical fiber 1N is Dn, and a cross-sectional area of the bare optical fiber 1N is Sg, the arithmetic unit 180 calculates the cross-sectional area Sg of the bare optical fiber 1N according to Formula (1) described below on the basis of a signal input from the first outer diameter measuring unit 121.

$$Sg = \Pi(Dn/2)^2 \tag{1}$$

Furthermore, in a case where a diameter of the optical fiber 1 is Dc, and a cross-sectional area of the coating layer 12 is Sc, the arithmetic unit 180 calculates the cross-sectional area Sc of the coating layer 12 according to Formula (2) described below on the basis of a signal input from the first outer diameter measuring unit 121 and a signal input from the second outer diameter measuring unit 122.

$$Sc = \Pi\{(Dc/2) - (Dn/2)\}^2 \tag{2}$$

Incidentally, tension measured by the tension meter 151 is tension applied to the optical fiber 1. Therefore, it can be considered that this tension is a value obtained by adding tension applied to the bare optical fiber 1N to tension applied to the coating layer 12. Here, in a case where the tension applied to the coating layer 12 is Tc, and the speed of withdrawing the optical fiber 1 is V, the tension Tc can be calculated according to Formula (3) described below.

$$Tc = \alpha \cdot \beta \cdot V \cdot Sc \tag{3}$$

Note that a is tension per unit area of the coating layer 12, B is a constant of proportionality, and these values have been stored in the memory 190. In a case where the tension measured by the tension meter 151 is Tf, and the tension applied to the bare optical fiber 1N is Tg, the arithmetic unit 180 according to one or more embodiments calculates the tension Tg according to Formula (4) described below.

$$Tg = Tf - \alpha \cdot \beta \cdot V \cdot Sc \tag{4}$$

Furthermore, in one or more embodiments, the arithmetic unit 180 calculates T expressed by Formula (5) described below on the basis of the cross-sectional area Sg of the bare optical fiber 1N that has been calculated according to Formula (2), and the tension Tg that has been calculated according to Formula (4), and outputs a signal indicating a calculated value to the control unit CO.

$$T = Tg \times (s_{target}/Sg) \tag{5}$$

Note that $S_{target}$ is a cross-sectional area that is a target of the bare optical fiber 1N, and this value has been stored in the memory 190. Here, in practice, the tension Tg applied to the bare optical fiber 1N receives an influence of a variation in the cross-sectional area Sg of the bare optical fiber 1N. Accordingly, T expressed by Formula (5) described above is the tension Tg in consideration of a ratio of a cross-sectional area of the bare optical fiber 1N and a target value $S_{target}$ of the cross-sectional area of the bare optical fiber 1N, and is tension applied to the bare optical fiber 1N in consideration of an influence of a variation in the cross-sectional area Sg of the bare optical fiber 1N.

In one or more embodiments, the arithmetic unit 180 outputs a signal indicating a value of T described above, as tension applied to the optical fiber 1, to the control unit CO. Furthermore, the arithmetic unit 180 also outputs, to the control unit CO, a signal indicating a value of the speed of withdrawing the optical fiber 1 that has been input from the speedometer 161.

Next, a method for manufacturing the optical fiber 1 by using the optical fiber manufacturing apparatus 100 is described.

Figure 4:
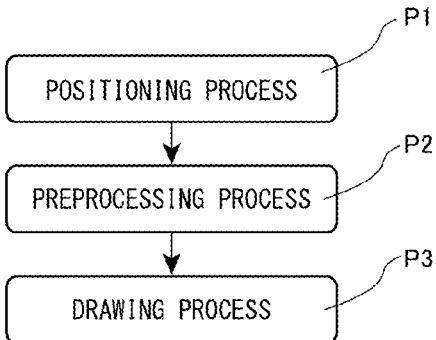
FIG. 4 is a flowchart illustrating processes of an optical fiber manufacturing method according to one or more embodiments.

FIG. 4 is a flowchart illustrating processes of a method for manufacturing the optical fiber 1 according to one or more embodiments. As illustrated in FIG. 4, this manufacturing method includes a positioning process P1, a preprocessing process P2, and a drawing process P3.

(Positioning Process P1)

First, as a stage of preparation for the present process, the optical fiber preform 1P illustrated in FIG. 2 is prepared, for example, by purchasing the optical fiber preform 1P, and is fixed to the feeder 115 of the optical fiber manufacturing apparatus 100. Furthermore, the control unit CO controls the power supply unit 200 to supply power from the power supply unit 200 to the heater 112, and heat the core tube 111. In one or more embodiments, power supplied from the power supply unit 200 to the heater 112 is constant power. In a state where the core tube 111 is being heated, the control unit CO controls the feeder 115, causes the feeder 115 to feed the optical fiber preform 1P, and causes the optical fiber preform 1P to be fed to the housing space of the core tube 111 from the lower end side. The lower end portion of the optical fiber preform 1P enters into a molten state. As a result, the neck-down portion ND that is tapered downward is formed in the lower end portion of the optical fiber preform 1P. The feeder 115 is caused to feed the optical fiber preform 1P, and therefore this neck-down portion ND is lowered to a position of the heater 112. Note that the position of the heater 112 is a position that overlaps a section from an upper end portion to a lower end portion of the heater 112 in a position along a center axis line of the core tube 111. In one or more embodiments, the optical fiber preform 1P is fed to the housing space until an upper end of the neck-down portion ND is located in a specified position above a center of the heater 112 and below an upper end of the heater 112 by a predetermined distance. As a result, the optical fiber preform 1P is positioned.

In one or more embodiments, while the optical fiber preform 1P is being lowered, similarly, the optical fiber 1 is drawn from the neck-down portion ND of the optical fiber preform 1P. The control unit CO controls the withdrawal device 160 on the basis of a value of the outer diameter of the optical fiber 1 that has been measured by the second outer diameter measuring unit 122 in such a way that the outer diameter of the optical fiber 1 has a target value, and adjusts the speed of withdrawing the optical fiber 1. However, during the present process, the temperature of a portion in a molten state of the optical fiber preform 1P has risen, and therefore the outer diameter of the drawn optical fiber 1 is not stable. Note that power may be supplied from the power supply unit 200 to the heater 112 after the optical fiber preform 1P has been positioned, and power to be supplied to the heater 112 may be inconstant. Furthermore, the control unit CO may control the withdrawal device 160 on the basis of a value of the outer diameter of the bare optical fiber 1N that has been measured by the first outer diameter measuring unit 121 in such a way that the outer diameter of the bare optical fiber 1N has a target value, and may adjust the speed of withdrawing the optical fiber 1.

(Preprocessing Process P2)

Next, the present process is performed. In general, certain values of tension applied to the drawn optical fiber 1 and the speed of withdrawing the optical fiber 1 stabilize the outer diameter of the drawn optical fiber 1. Such values are specified according to, for example, a material of the optical fiber preform 1P, a drawing furnace, or the like, and can be obtained in an experiment or the like. Such a value for each of the tension and the speed that have been described above has been stored as a target value in the memory 190. In the present process, the control unit CO controls the withdrawal device 160 on the basis of a value of the outer diameter of the optical fiber 1 that has been input from the second outer diameter measuring unit 122 and a value of the speed of withdrawing the optical fiber 1 that has been measured by the speedometer 161 in such a way that the speed described above increases to the target value, and the outer diameter of the optical fiber 1 has a predetermined value. Note that the control unit CO may control the withdrawal device 160 on the basis of a value of the outer diameter of the bare optical fiber 1N that has been measured by the first outer diameter measuring unit 121 and a value of the speed of withdrawing the optical fiber 1 that has been measured by the speedometer 161. Furthermore, the control unit CO controls the power supply unit 200 on the basis of a value of tension T applied to the optical fiber 1 that has been calculated by the arithmetic unit 180 and a value of the speed measured by the speedometer 161. Specifically, in a case where the speed of withdrawing the optical fiber 1 is V, the target value of tension is $T_{target}$, and the target value of the speed is $V_{target}$, the control unit CO controls the power supply unit 200 in such a way that T/V decreases to $T_{target}/V_{target}$ along a quadratic function having a value of $T_{target}/V_{target}$ at an apex with the lapse of time, and the temperature of heating the optical fiber preform 1P is adjusted.

In one or more embodiments, it is assumed that the quadratic function described above indicating a change over time T(t)/V(t) of T/V described above is expressed by Formula (6) described below, in a case where the time required for T/V to change to $T_{target}/V_{target}$ is t0, and a constant specified in advance according to the optical fiber preform 1P is $a_0$.

$$T(t)/V(t) = a_0(t - t_0)^2 + (T_{target}/V_{target}) \qquad (6)$$

Here, the present inventor has intensively studied a change over time in T/V during a period after the optical fiber preform 1P starts to be heated and before T/V described above becomes roughly constant. As a result, the present inventor has discovered that in a case where constant power is supplied to the drawing furnace 110, T/V decreases along a quadratic function having a minimum value at an apex with the lapse of time until a certain point in time to reach the apex of this quadratic function, from the certain point in time, T/V becomes roughly constant at a value of this apex, and this roughly constant value corresponds to a value of the constant power. Therefore, the constant $a_0$ and the time t0 that have been described above can be obtained in advance for the optical fiber preform 1P in an experiment or the like, and constant power that causes T/V to decrease according to Formula (6) can also be grasped in advance. In one or more embodiments, these values obtained in an experiment in advance have been stored in the memory 190. Furthermore, in one or more embodiments, it is assumed that the constant power supplied to the heater 112 in the positioning process P1 described above is the constant power that causes T/V to decrease according to Formula (6). Therefore, power supplied to the heater 112 in an initial stage of the preprocessing process P2 is the constant power described above. Thus, T/V decreases roughly along a quadratic function having a value of $T_{target}/V_{target}$ at an apex with the lapse of time, and this enables a reduction in a control load of the control unit CO.

Figure 5:
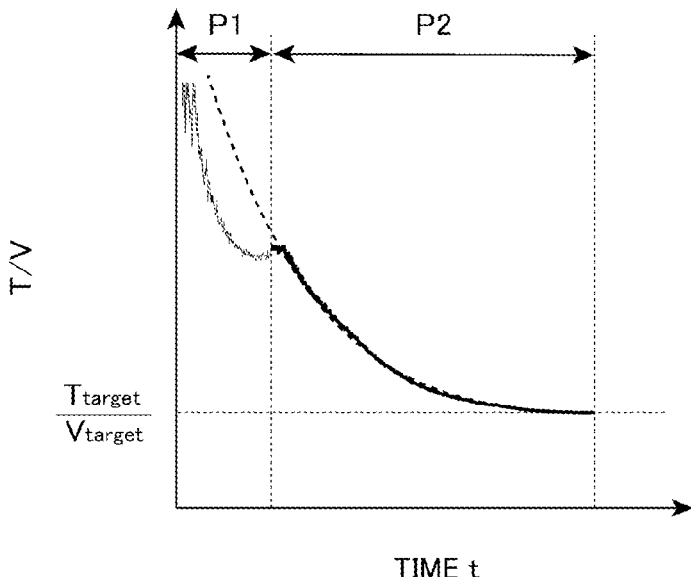
FIG. 5 is a graph illustrating a change over time in T/V according to one or more embodiments.

FIG. 5 is a graph illustrating a change over time in T/V according to one or more embodiments. In the graph of FIG. 5, a portion illustrated with a thin line indicates a change over time in T/V during a period of the positioning process P1. In contrast, a portion illustrated with a thick line indicates a change over time in T/V during a period of the preprocessing process P2. Furthermore, in FIG. 5, Formula (6) described above is illustrated with a broken line. As illustrated in FIG. 5, in the preprocessing process P2, T/V decreases along the quadratic function having a value of $T_{target}/V_{target}$ at an apex with the lapse of time such that T/V becomes $T_{target}/V_{target}$, the speed V becomes $V_{target}$, and the tension T becomes $T_{target}$. Then, it enters into a state where the outer diameter of the bare optical fiber 1N is stable and the outer diameter of the optical fiber 1 is stable.

(Drawing Process P3)

The present process is a process of drawing the optical fiber 1 after the preprocessing process P2, that is, in a state where the outer diameter of the optical fiber 1 is stable. In one or more embodiments, the control unit CO controls the feeder 115 in such a way that a position of the neck-down portion ND of the optical fiber preform 1P relative to the heater 112 does not change, and an amount of feeding of the optical fiber preform 1P is adjusted. The control unit CO also controls the withdrawal device 160 in such a way that the speed V measured by the speedometer 161 is maintained to $V_{target}$ on the basis of a value of the speed V. Furthermore, the control unit CO controls the power supply unit 200 in such a way that T/V is maintained to $T_{target}/V_{target}$, and the temperature of heating the optical fiber preform 1P is adjusted. Therefore, the optical fiber 1 in which the outer diameter has a target value can be stably drawn.

As described above, an optical fiber manufacturing method according to one or more embodiments includes the preprocessing process P2. In the preprocessing process P2, in a case where tension applied to the optical fiber 1 and the speed of withdrawing the optical fiber 1 in heating the optical fiber preform 1P by using the drawing furnace 110 and drawing the optical fiber 1 are respectively T and V, a target value of the tension is $T_{target}$, and a target value of the speed is $V_{target}$, power is supplied to the drawing furnace 110 in such a way that T/V decreases to $T_{target}/V_{target}$ along a quadratic function having a value of $T_{target}/V_{target}$ at an apex with the lapse of time.

Furthermore, the optical fiber manufacturing apparatus 100 according to one or more embodiments includes the drawing furnace 110 that heats the optical fiber preform 1P and draws the optical fiber 1, the power supply unit 200 that supplies power to the drawing furnace 110, and the control unit CO. The control unit CO controls the power supply unit 200 in such a way that T/V decreases to $T_{target}/V_{target}$ along a quadratic function having a value of $T_{target}/V_{target}$ at an apex with the lapse of time.

As a result of intensive studies, the present inventor has discovered that by causing T/V to decrease to $T_{target}/V_{target}$ along the quadratic function described above, T/V is not likely to deviate from $T_{target}/V_{target}$ after T/V has become $T_{target}/V_{target}$ in comparison with a case where T/V linearly decreases, that is, a case where a rate of decrease in T/V is roughly constant. Therefore, power to be supplied to the drawing furnace 110 is prevented from being adjusted after T/V has become $T_{target}/V_{target}$. Accordingly, by employing the optical fiber manufacturing method and the optical fiber manufacturing apparatus 100 according to one or more embodiments, the time required for T/V to stabilize at a target value, that is, the time required for tension T and speed V to stabilize at a target value, can be reduced, and the productivity of the optical fiber 1 can be improved.

Furthermore, in the optical fiber manufacturing method and the optical fiber manufacturing apparatus 100 according to one or more embodiments, the tension T is calculated according to Formula (5) described above, where tension applied to the bare optical fiber 1N is Tg, a cross-sectional area of the bare optical fiber 1N is Sg, and a target value of the cross-sectional area of the bare optical fiber 1N is $S_{target}$. Accordingly, the tension T according to one or more embodiments is the tension applied to the bare optical fiber 1N, and a value of the tension T does not include a component of tension caused by the coating layer 12. Therefore, a value of T/V can be more accurately calculated than a case where the value of the tension T includes the component of the tension caused by the coating layer 12.

Furthermore, in practice, the tension Tg applied to the bare optical fiber 1N receives an influence of a variation in the cross-sectional area Sg of the bare optical fiber 1N. Accordingly, as described in one or more embodiments, a ratio of a measured value of the cross-sectional area of the bare optical fiber 1N and a target value of the cross-sectional area of the bare optical fiber 1N is taken into consideration in the tension Tg according to Formula (5), and this enables a value of T/V to be more accurately calculated.

Furthermore, as illustrated in FIG. 5, it is apparent that a change over time in T/V in the positioning process P1 serving as a period before a distal end of the optical fiber preform 1P reaches a position of the heater 112 has a tendency of deviating from a quadratic function. Therefore, before the neck-down portion ND of the optical fiber preform 1P has reached the position of the heater 112, it is difficult to cause T/V to decrease along the quadratic function, and a control load can be imposed. In one or more embodiments, the preprocessing process P2 is performed after the positioning process P1, and this enables such a control load to be reduced. However, the preprocessing process P2 may be performed during the positioning process P1.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, in the embodiments described above, description has been provided by using, as an example, the preprocessing process P2 for supplying power to the drawing furnace 110 in such a way that T/V decreases according to Formula (6) described above. However, in the preprocessing process P2, it is sufficient if power is supplied to the drawing furnace 110 in such a way that T/V decreases to $T_{target}/V_{target}$ along a quadratic function having a value of $T_{target}/V_{target}$ at an apex with the lapse of time.

For example, a variation of the preprocessing process, as described below, may be performed.

Figure 6:
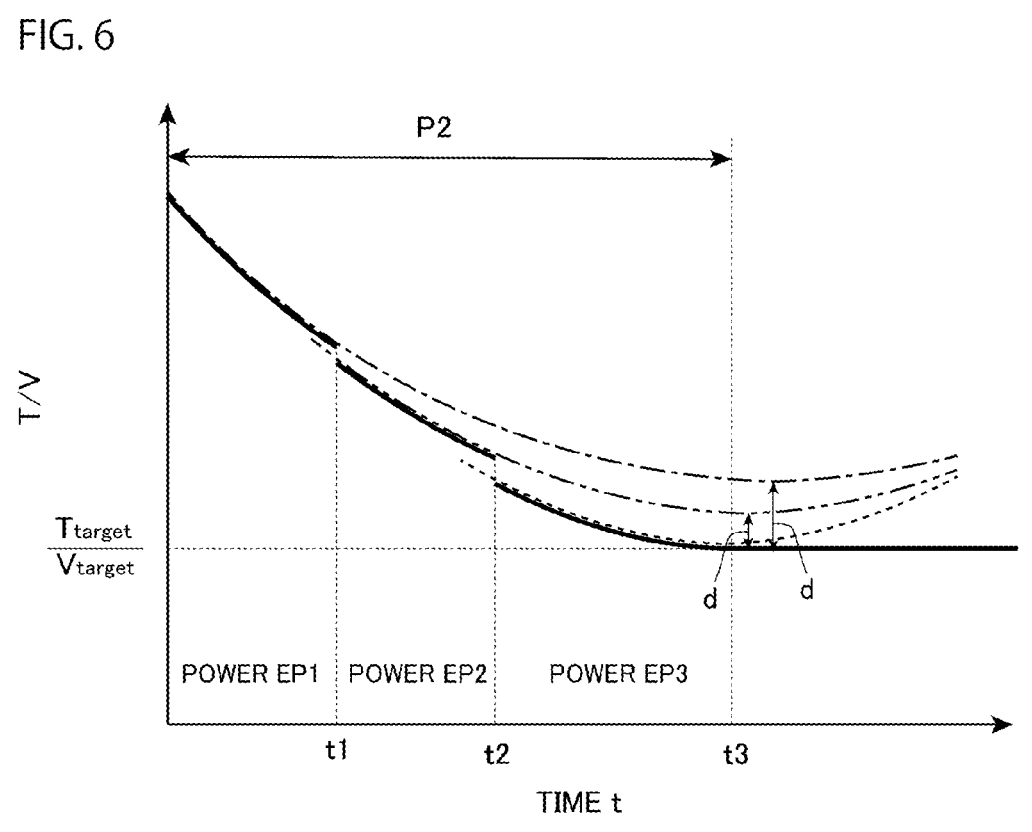

In the present variation, after the optical fiber preform 1P has been positioned in the positioning process P1 described above, constant power EP1 is supplied to the drawing furnace 110. In the present variation, it is assumed that the constant power EP1 is the same as the constant power supplied in the positioning process P1, but they may be different from each other. Power supplied to the drawing furnace 110 is constant, and therefore T/V decreases along the quadratic function during a period of supply of the constant power EP1. FIG. 6 is a graph schematically illustrating a change over time in T/V according to the present variation, and the change over time in T/V is illustrated with a solid line. The arithmetic unit 180 calculates a quadratic function indicating a change over time in T/V by using approximation on the basis of a plurality of values of T/V during a period of supply of the constant power EP1. In FIG. 6, the calculated quadratic function is illustrated with a dash-dotted line. Note that the quadratic function is illustrated in such a way as to slightly deviate from a change over time in T/V. An example of an approximation method is a least-squares method. The arithmetic unit 180 calculates a difference d between a value of T/V at an apex of the quadratic function and $T_{target}/V_{target}$, and outputs a signal indicating the difference d to the control unit CO. In the present variation, it is assumed that this difference d is obtained by subtracting $T_{target}/V_{target}$ from a value of T/V, and is positive or negative.

The control unit CO controls the power supply unit 200 on the basis of this difference d. Specifically, in a case where this difference d is positive and an absolute value of the difference d is greater than a predetermined value, the control unit CO controls the power supply unit 200 in such a way that power to be supplied to the drawing furnace 110 is constant power that is higher than the constant power EP1 from time t1. Therefore, the viscosity of the optical fiber preform 1P in a molten state decreases, and the tension T decreases. This results in a decrease in T/V. In contrast, in a case where this difference d is negative and an absolute value of the difference d is greater than the predetermined value, the control unit CO controls the power supply unit 200 in such a way that power to be supplied to the drawing furnace 110 is constant power that is lower than the constant power EP1 from time t1. Therefore, the viscosity of the optical fiber preform 1P in a molten state increases, and the tension T increases. This results in an increase in T/V. Furthermore, in a case where an absolute value of this difference d is less than or equal to the predetermined value, the control unit CO controls the power supply unit 200 in such a way that power to be supplied to the drawing furnace 110 is also maintained to the constant power EP1 at and after time t1. FIG. 6 illustrates a case where power to be supplied to the drawing furnace 110 is changed to constant power EP2 that is higher than the constant power EP1 from time t1.

The arithmetic unit 180 calculates a quadratic function indicating a change over time in T/V by using approximation on the basis of a plurality of values of T/V at and after time t1. In FIG. 6, the calculated quadratic function is illustrated with a dash-double-dotted line. Note that the quadratic function is illustrated in such a way as to slightly deviate from a change over time in T/V. Furthermore, the arithmetic unit 180 calculates a difference d between a value of T/V at an apex of the quadratic function and $T_{target}/V_{target}$, and outputs a signal indicating the difference d to the control unit CO. The control unit CO controls the power supply unit 200 on the basis of this difference d similarly to a time when the arithmetic unit 180 has calculated a difference d between a value of T/V and $T_{target}/V_{target}$ before time t1.

Then, calculation of a quadratic function indicating a change over time in T/V and a change in constant power based on a difference d between a value of T/V at an apex of the quadratic function and $T_{target}/V_{target}$ are repeated until the value of T/V becomes $T_{target}/V_{target}$. FIG. 6 illustrates a case where constant power EP3 that is higher than the constant power EP2 is supplied to the drawing furnace 110 from time t2 when a predetermined time period has passed from time t1. Furthermore, a quadratic function calculated on the basis of a plurality of values of T/V during a period of supply of the constant power EP3 is illustrated with a broken line. In the example illustrated in FIG. 6, an absolute value of a difference between a value of T/V at an apex of this quadratic function and $T_{target}/V_{target}$ is less than the predetermined value described above, and a value of T/V at time t3 is $T_{target}/V_{target}$.

As described above, in the preprocessing process in this variation, constant power is supplied to the drawing furnace 110 during a predetermined period, and therefore a quadratic function indicating a change over time in T/V is obtained, and the constant power to be supplied to the drawing furnace 110 is changed on the basis of a difference d between a value of T/V at an apex of the quadratic function and $T_{target}/V_{target}$. This enables T/V to decrease to $T_{target}/V_{target}$ along a quadratic function having an apex of $T_{target}/V_{target}$ with the lapse of time, without specifying in advance the quadratic function having an apex of $T_{target}/V_{target}$ in an experiment or the like.

Furthermore, in the embodiments described above, an example where the tension T is calculated according to Function (5) has been described. However, the tension T may be a value calculated according to Formula (4) described above. In this case, similarly, the tension T is the tension applied to the bare optical fiber 1N, and a value of the tension T does not include a component of tension caused by the coating layer 12. Therefore, a value of T/V in the bare optical fiber 1N can be more accurately calculated than a case where the value of the tension T includes the component of the tension caused by the coating layer 12. Furthermore, an arithmetic operation according to Formula (5) is omitted, and this enables a reduction in a control load. Alternatively, the tension T may be a value measured by the tension meter 151. In this case, an arithmetic operation according to Formula (4) or Formula (5) is omitted, and this enables a reduction in a control load.

According to one or more embodiments, an optical fiber manufacturing method and an optical fiber manufacturing apparatus that are capable of improving productivity of an optical fiber are provided, and can be utilized in a variety of fields relating to an optical fiber.

The invention claimed is:

1. An optical fiber manufacturing method comprising:
heating an optical fiber preform by a drawing furnace;
drawing an optical fiber; and
supplying power to the drawing furnace to cause T/V to decrease to $T_{target}/V_{target}$ along a quadratic function having a value of the $T_{target}/V_{target}$ at an apex with lapse of time, where T is a tension applied to the optical fiber when the optical fiber preform is heated by the drawing furnace and the optical fiber is drawn, V is speed of withdrawing the optical fiber when the optical fiber is heated by the drawing furnace and the optical fiber is drawn, $T_{target}$ is a target value of the tension, and $V_{target}$ is a target value of the speed.

2. The optical fiber manufacturing method according to claim 1, wherein $T(t)/V(t)=a_0(t-t_0)^2+(T_{target}/V_{target})$ is satisfied, where $T(t)/V(t)$ is the quadratic function indicating a change over time, $t_0$ is time when the T/V reaches the $T_{target}/V_{target}$, $a_0$ is a constant that is specified according to a material of the optical fiber preform.

3. The optical fiber manufacturing method according to claim 1, wherein in the supplying of power to the drawing furnace, first constant power is supplied to the drawing furnace during a period to obtain an additional quadratic function indicating a change over time in the T/V, and second constant power is changed based on a difference between a value of the T/V at an apex of the additional quadratic function and the $T_{target}/V_{target}$.

4. The optical fiber manufacturing method according to claim 1 further comprising:
inserting a neck-down portion of the optical fiber preform into a heater in the drawing furnace, wherein
the supplying of power to the drawing furnace is performed after the inserting of the neck-down portion.

5. The optical fiber manufacturing method according to claim 1, wherein
the optical fiber is a bare optical fiber, and
the tension is applied to the bare optical fiber.

6. The optical fiber manufacturing method according to claim 1, wherein
the optical fiber is a bare optical fiber, and
the tension T is calculated by $T=Tg \times (S_{target}/Sg)$, where
Tg is a tension applied to the bare optical fiber,
Sg is a cross-sectional area of the bare optical fiber, and
$S_{target}$ is a target value of the cross-sectional area of the bare optical fiber.

7. An optical fiber manufacturing apparatus comprising:
a drawing furnace that heats an optical fiber preform and draws an optical fiber;
a power supplier that supplies power to the drawing furnace; and
a controller that controls the power supplier to cause T/V to decrease to $T_{target}/V_{target}$ along a quadratic function having a value of the $T_{target}/V_{target}$ at an apex with lapse of time, where
T is a tension applied to the optical fiber when the optical fiber preform is heated by the drawing furnace and the optical fiber is drawn,
V is speed of withdrawing the optical fiber when the optical fiber is heated by the drawing furnace and the optical fiber is drawn,
$T_{target}$ is a target value of the tension, and
$V_{target}$ is a target value of the speed.

* * * * *